US012810729B2

(12) United States Patent
Matsumoto

(10) Patent No.: US 12,810,729 B2
(45) Date of Patent: Nov. 24, 2026

(54) INFORMATION PROCESSING APPARATUS AND INFORMATION PROCESSING METHOD FOR SELECTIVELY EXECUTING ATTENTION-ATTRACTING OPERATION

(71) Applicant: Panasonic Automotive Systems Co., Ltd., Kanagawa (JP)

(72) Inventor: Hidenori Matsumoto, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 53 days.

(21) Appl. No.: 19/037,849

(22) Filed: Jan. 27, 2025

(65) Prior Publication Data

US 2025/0174129 A1 May 29, 2025

Related U.S. Application Data

(63) Continuation of application No. PCT/JP2023/037341, filed on Oct. 16, 2023.

(30) Foreign Application Priority Data

Oct. 21, 2022 (JP) ................................. 2022-169166

(51) Int. Cl.
*G08G 1/16* (2006.01)
*G08G 1/052* (2006.01)

(52) U.S. Cl.
CPC ............ *G08G 1/166* (2013.01); *G08G 1/052* (2013.01); *G08G 1/164* (2013.01)

(58) Field of Classification Search
CPC ........ G08G 1/166; G08G 1/052; G08G 1/164; G08G 1/005; G08G 1/012; G08G 1/16
See application file for complete search history.

(56) References Cited

U.S. PATENT DOCUMENTS 11,830,357 B1 * 11/2023 Murphy ........... G08G 1/096716
12,380,805 B2 * 8/2025 Kimata .................. G08G 1/052
(Continued)

FOREIGN PATENT DOCUMENTS

JP 2004-157847 6/2004
JP 2009-251758 10/2009
(Continued)

OTHER PUBLICATIONS

Machine translation of WO 2018021191 A1 (Year: 2018).*
(Continued)

*Primary Examiner* — Dino Kujundzic
(74) *Attorney, Agent, or Firm* — Greenblum & Bernstein, P.L.C.

(57) ABSTRACT

An information processing apparatus which, in operation, collects movement state information on each of a plurality of users and determines, based on the movement state information, whether there is a possibility of a dangerous state, the information processing apparatus comprising: a processor; and a memory having instructions that, when executed by the processor, cause the processor to perform operations comprising: acquiring attribute information on each of the plurality of users; and determining, based on the attribute information on each of some users of the plurality of users, at which terminal apparatus among respective terminal apparatuses of the some users an attention-attracting operation is executed, the some users being users between whom there is the possibility of the dangerous state.

20 Claims, 6 Drawing Sheets

(56) References Cited

U.S. PATENT DOCUMENTS

| | | | | |
|---|---|---|---|---|
| 2018/0302752 | A1 | 10/2018 | Ueno et al. | |
| 2020/0019627 | A1* | 1/2020 | Stenneth | G06T 7/70 |
| 2022/0101732 | A1* | 3/2022 | Saur | G08G 1/163 |
| 2022/0208008 | A1* | 6/2022 | Matsuoka | B60W 50/14 |
| 2024/0038058 | A1* | 2/2024 | Sadu | H04L 67/12 |

FOREIGN PATENT DOCUMENTS

| | | |
|---|---|---|
| JP | 2018-13847 | 1/2018 |
| JP | 2021-117089 | 8/2021 |
| WO | 2017/104093 | 6/2017 |
| WO | 2018/021191 | 2/2018 |
| WO | 2021/039772 | 3/2021 |
| WO | 2022/196028 | 9/2022 |

OTHER PUBLICATIONS

International Search Report issued in International Patent Application No. PCT/JP2023/037341, dated Nov. 7, 2023 along with corresponding English translation.

Notice of Reasons for Refusal dated Dec. 9, 2025 issued in Japanese Patent Application No. 2022-169166 along with an English translation.

* cited by examiner

INFORMATION PROCESSING APPARATUS AND INFORMATION PROCESSING METHOD FOR SELECTIVELY EXECUTING ATTENTION-ATTRACTING OPERATION

TECHNICAL FIELD

The present disclosure relates to an information processing apparatus and an information processing method.

BACKGROUND ART

In the related art, there is known an apparatus that assists either the holder of a portable terminal or the driver of a vehicle so as to prevent the holder and the vehicle from approaching each other abnormally. For example, Patent Literature (hereinafter referred to as "PTL") 1 discloses an apparatus that discriminates whether the holder of a portable terminal is in a state of riding a bicycle, and attracts attention in different modes according to the result of the discrimination.

CITATION LIST

Patent Literature

PTL 1
Japanese Patent Application Laid-Open No. 2009-251758

SUMMARY OF INVENTION

Technical Problem

With respect to the apparatus in the related art, however, there is room for improvement in convenience.

An object of the present disclosure is to provide an information processing apparatus and an information processing method with much improved convenience.

Solution to Problem

An information processing apparatus according to an aspect of the present disclosure is an information processing apparatus which, in operation, collects movement state information on each of a plurality of users and determines, based on the movement state information, whether there is a possibility of a dangerous state, the information processing apparatus comprising: a processor; and a memory having instructions that, when executed by the processor, cause the processor to perform operations comprising: acquiring attribute information on each of the plurality of users; and determining, based on the attribute information on each of some users of the plurality of users, at which terminal apparatus among respective terminal apparatuses of the some users an attention-attracting operation is executed, the some users being users between whom there is the possibility of the dangerous state.

An information processing method according to an aspect of the present disclosure is an information processing method to be executed by an information processing apparatus which, in operation, collects movement state information on each of a plurality of users and determines, based on the movement state information, whether there is a possibility of a dangerous state, the information processing method comprising: acquiring attribute information on each of the plurality of users; and determining, based on the attribute information on each of some users of the plurality of users, at which terminal apparatus among respective terminal apparatuses of the some users an attention-attracting operation is executed, the some users being users between whom there is the possibility of the dangerous state.

Advantageous Effects of Invention

According to the present disclosure, it is possible to provide an information processing apparatus and an information processing method with much improved convenience.

DESCRIPTION OF EMBODIMENTS

Hereinafter, an embodiment of the present disclosure will be described in detail with reference to the accompanying drawings.

Figure 1:
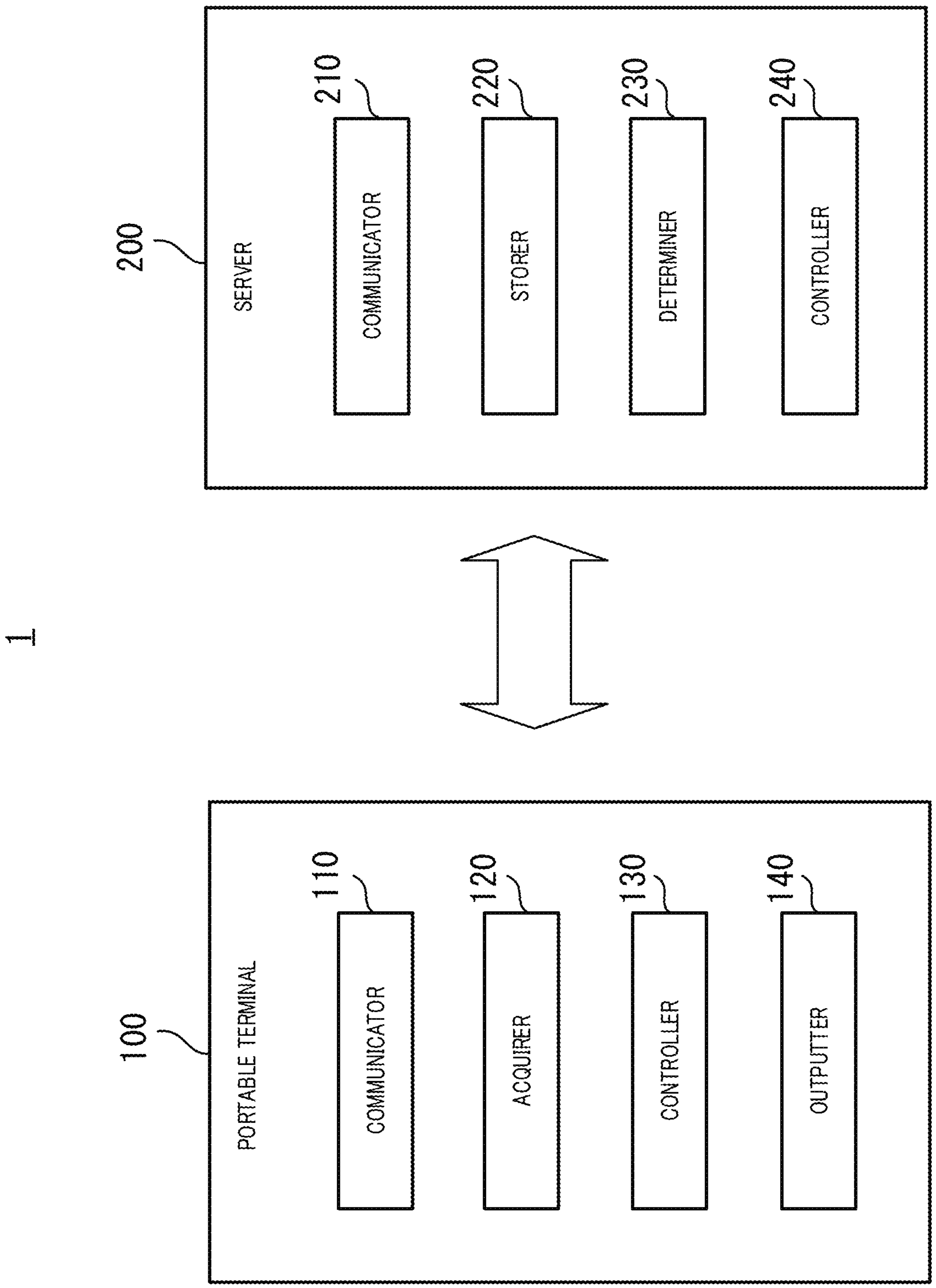
FIG. 1 is a block diagram illustrating an exemplary configuration of a safety assistance system according to an embodiment of the present disclosure.

An exemplary configuration of safety assistance system 1 according to the present embodiment will be described using FIG. 1. FIG. 1 is a block diagram illustrating an exemplary configuration of safety assistance system 1.

As illustrated in FIG. 1, safety assistance system 1 includes portable terminal 100 and server 200. Both portable terminal 100 and server 200 correspond to examples of the "information processing apparatus" in the present disclosure.

Figure 2:
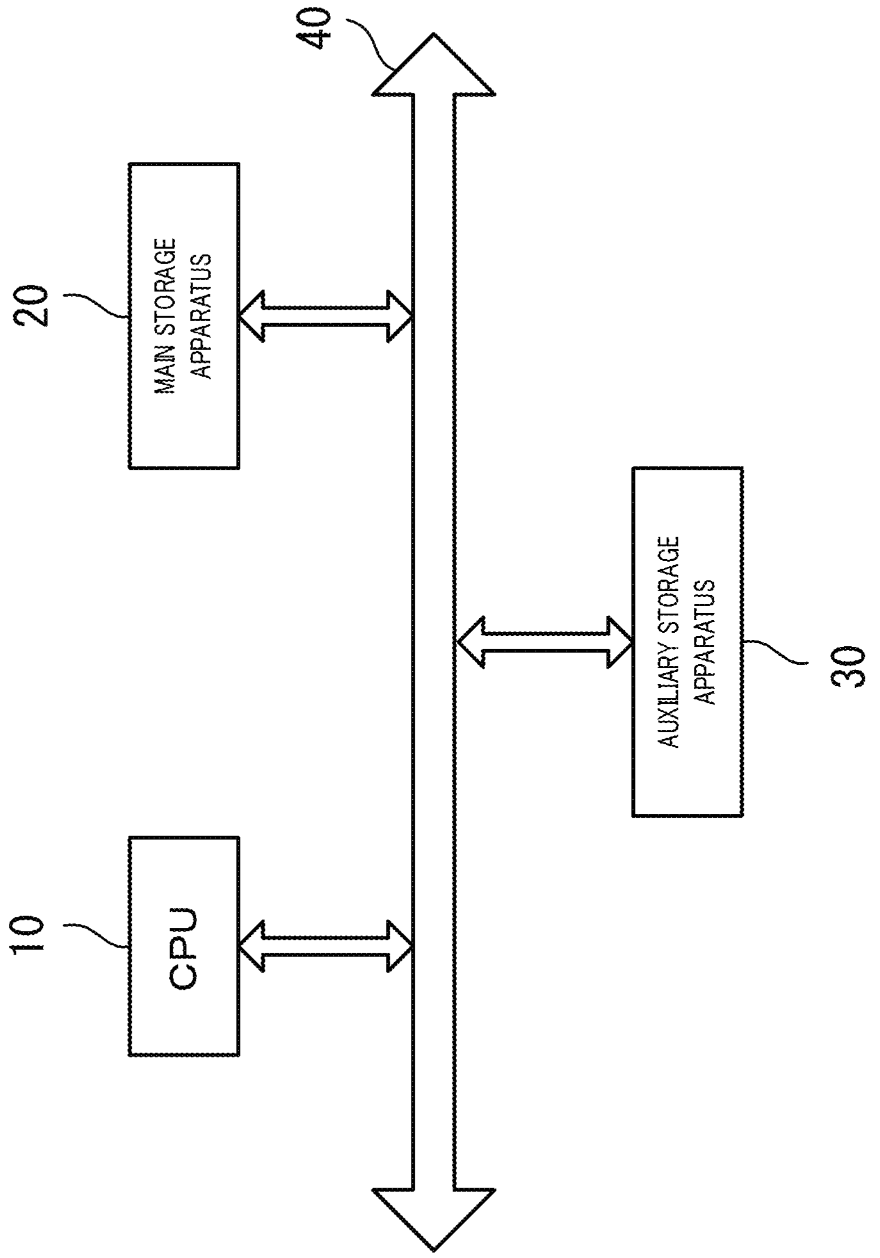
FIG. 2 illustrates an exemplary hardware configuration of a computer included in a portable terminal or a server according to the embodiment of the present disclosure.

As illustrated in FIG. 2, each of portable terminal 100 and server 200 includes, as hardware, central processing unit (CPU) 10, main storage apparatus 20 such as a read only memory (ROM) and a random access memory (RAM), auxiliary storage apparatus 30 storing computer programs, such as a hard disk and a flash memory, and bus 40 connecting CPU 10, main storage apparatus 20, and auxiliary storage apparatus 30, for example.

The respective functions of portable terminal 100 and server 200 to be described later are implemented by CPU 10 developing a computer program read from auxiliary storage apparatus 30 to the RAM of main storage apparatus 20 and executing the program. Note that, the computer program may be provided to a user or the like by being recorded on a predetermined recording medium or through network distribution.

First, portable terminal 100 will be described.

Portable terminal 100 is a terminal apparatus that is held (carried) by a user who moves. Examples of portable terminal 100 include, albeit not limited to, a smartphone, a tablet, and a smartwatch. Note that, the functions of portable terminal 100 to be described later may also be implemented by an edge server between a cloud computing server and a user terminal.

Note that, although FIG. 1 illustrates only one portable terminal 100 for convenience, it is assumed that a plurality of portable terminals 100 is present in practice.

As illustrated in FIG. 1, portable terminal 100 includes communicator 110, acquirer 120, controller 130, and outputter 140.

Communicator 110 is a communication device that performs network communication, such as internet communication, or cellular communication (communication using a mobile communication network).

For example, communicator 110 transmits movement state information and attribute information, which will be described later, to server 200 and receives determination result information to be described later from server 200.

Further, communicator 110 includes a communication device that performs wireless communication, such as radio frequency identification (RFID), Bluetooth (registered trademark), and Wi-Fi (registered trademark).

That is, communicator 110 in the present embodiment represents a concept that includes both a device that realizes internet communication and a device that realizes wireless communication (not in the meaning that the communication functions of the both are implemented by one device).

Acquirer 120 is an acquisition device that acquires various information. It is assumed that the term "acquire" here includes meanings such as "detect" and "estimate".

For example, acquirer 120 periodically acquires movement state information indicating the movement state of a user who holds portable terminal 100 (hereinafter, this user will be simply referred to as the user). The movement state information includes, for example, information indicating the current position, travel direction, movement speed, tilt, and/or the like of the user (who may also be referred to as portable terminal 100). In this case, examples of acquirer 120 include a global positioning system (GPS) receiver that receives a GPS signal, a processor that measures the current position and/or the like based on a GPS signal, and an accelerometer. Note that, the movement state information may include at least current position information, and may include, in addition to the current position information, travel direction information, speed information, tilt information, and/or the like.

Further, for example, acquirer 120 acquires attribute information indicating the attribute of the user. Examples of the attribute include pedestrian, cyclist (the driver of a bicycle), rider (the driver of a motorcycle), and driver (the driver of an automobile). In this case, examples of acquirer 120 include a processor that performs attribute determination processing (details will be described later).

Figure 3:
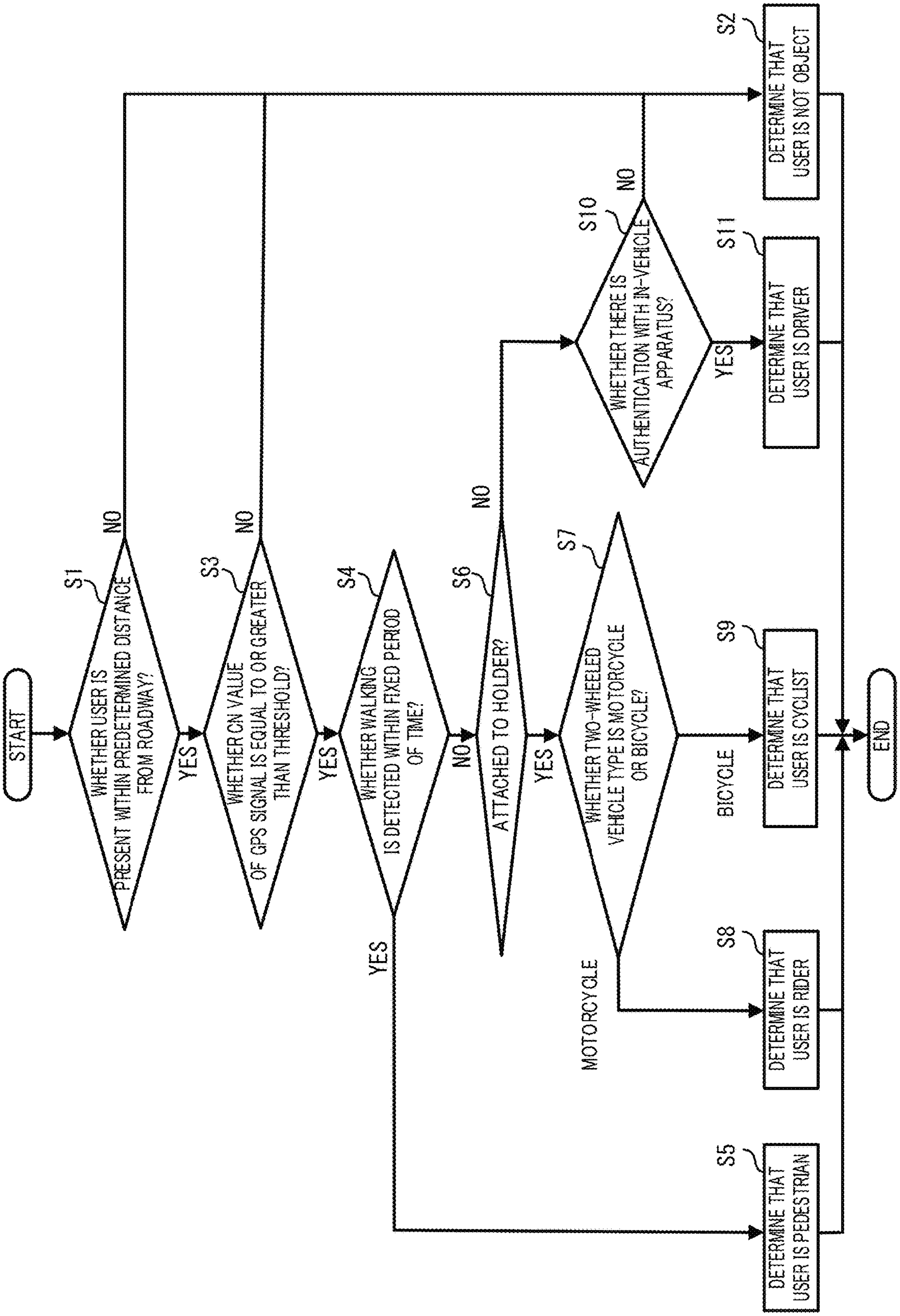
FIG. 3 is a flowchart illustrating exemplary attribute determination processing according to the embodiment of the present disclosure.

Here, the flow of the attribute determination processing that is performed at portable terminal 100 will be described using FIG. 3. FIG. 3 is a flowchart illustrating exemplary attribute determination processing. It is assumed that the attribute of the user is the pedestrian at the time of the start of the flow in FIG. 3. In addition, since the attribute of the user may switch, the flow in FIG. 3 is performed periodically.

First, acquirer 120 determines whether the user is present within a predetermined distance from the roadway (step S1).

For example, acquirer 120 collates the current position measured based on a GPS signal with the position of the roadway indicated in map information, and determines whether the user is present within the predetermined distance from the roadway. The map information here is, for example, information stored in a storer (illustration is omitted) of portable terminal 100.

In a case where the user is not present within the predetermined distance from the roadway (step S1/NO), acquirer 120 determines that the user is not an object of safety assistance (step S2).

In other words, the expression: not an object of safety assistance refers to a person who does not require attention attraction to be described later. In a case where the user is not present within the predetermined distance from the roadway, the user is considered to be at a location at which there is a low possibility that the user will get involved in a traffic accident, and thus, it is determined that the user is not an object of safety assistance.

Note that, in a case where it is determined that the user is not an object of safety assistance, the terminal performs transmission to the effect that the user is not an object of safety assistance, to the server. Note that, in a case where it is determined that the user is not an object of safety assistance, the movement state information and the attribute information on the user may not be transmitted to server 200. Thus, it is possible to reduce power consumption due to communication at portable terminal 100.

In a case where the user is present within the predetermined distance from the roadway (step S1/YES), on the other hand, acquirer 120 determines whether the CN (Carrier to Noise Ratio) value of the GPS signal is equal to or greater than a threshold set in advance (step S3).

In a case where the CN value of the GPS signal is not equal to or greater than the threshold (step S3/NO), acquirer 120 determines that the user is not an object of safety assistance (step S2).

In a case where the CN value is not equal to or greater than the threshold, it is conjectured that the user is indoors or in an environment in which the accuracy of the current position is not adequate, and it is judged that safety assistance is not required or appropriate assistance cannot be performed, and thus, it is determined that the user is not an object of assistance.

In a case where the CN value of the GPS signal is equal to or greater than the threshold (step S3/YES), on the other hand, acquirer 120 determines, for example, based on the detection result of an accelerometer or the like, whether walking is detected within a fixed period of time (step S4).

In this determination processing, the period of time during which the user is stopping walking due to waiting at the signal or the like is taken into consideration.

In a case where walking is detected within the fixed period of time (step S4: YES), acquirer 120 determines that the user is a pedestrian (step S5).

In a case where no walking is detected within the fixed period of time (step S4: NO), on the other hand, acquirer 120 determines whether portable terminal 100 is attached to a holder (step S6).

The holder is, for example, an instrument that is mounted in the body of a bicycle or a motorcycle and allows portable terminal 100 to be attached (housed) thereto (therein). This holder is provided with, for example, a non-contact IC tag (which may be a sensor). When portable terminal 100 is attached to the holder, communicator 110 receives two-wheeled vehicle type information, which has been registered in advance in the non-contact IC tag, from the non-contact IC tag. This two-wheeled vehicle type information indicates whether a two-wheeled vehicle to which the holder attached is a bicycle or a motorcycle. In a case where the two-wheeled vehicle type information is received, acquirer 120 determines that portable terminal 100 is attached to the holder, whereas in a case where the two-wheeled vehicle type information is not received, acquirer 120 determines that portable terminal 100 is not attached to the holder.

In a case where portable terminal 100 is attached to the holder (step S6/YES), acquirer 120 determines whether the two-wheeled vehicle type information indicates a motorcycle or a bicycle (step S7).

In a case where the two-wheeled vehicle type information indicates a motorcycle (step S7/motorcycle), acquirer 120 determines that the user is a rider (step S8).

In a case where the two-wheeled vehicle type information indicates a bicycle (step S7/bicycle), acquirer 120 determines that the user is a cyclist (step S9).

In a case where portable terminal 100 is not attached to the holder (step S6/NO), acquirer 120 determines whether there is authentication between portable terminal 100 and an in-vehicle apparatus (step S10).

The authentication here is, for example, albeit not limited to, pairing of Bluetooth (registered trademark). Further, the in-vehicle apparatus is, for example, albeit not limited to, a car navigation system having the Bluetooth (registered trademark) communication function.

In a case where the authentication is performed between portable terminal 100 and the in-vehicle apparatus (step S10/YES), acquirer 120 determines that the user is a driver (step S11).

In a case where no authentication is performed between portable terminal 100 and the in-vehicle apparatus (step S10/NO), acquirer 120 determines that the user is not an object of safety assistance (step S2).

The attribute determination processing has been described above. Note that, the flow in FIG. 3 is one example, and the attribute may be determined using any other method known in the art. Further, although a case where portable terminal 100 performs the attribute determination processing has been described here as an example, server 200 may perform the attribute determination processing. In that case, it is assumed that server 200 acquires information necessary for the attribute determination processing from portable terminal 100 or any other apparatus. Hereinafter, acquirer 120 will be described again.

Acquirer 120 acquires (generates), based on the result of the attribute determination processing described above, attribute information indicating that the user is one of a pedestrian, a cyclist, a rider, and a driver.

Note that, in the present embodiment, a case where acquirer 120 acquires the attribute information by the execution of the attribute determination processing has been described as an example, but the present disclosure is not limited thereto. For example, acquirer 120 may acquire the attribute information by reception of an attribute input operation by the user.

In addition, the attribute of the user may be changed. For example, in a case where the user who has left his/her home walks to a parking lot and moves on an automobile from the parking lot, acquirer 120 changes the attribute of the user from the pedestrian to the driver. In a case where there is a change of the attribute as described above, the attribute information after the change is transmitted, together with the movement state information at the time of the change, to server 200.

Controller 130 is a control device that executes various controls.

For example, controller 130 controls communicator 110 such that communicator 110 transmits the movement state information and the attribute information, which have been described above, to server 200. Note that, the movement state information and the attribute information that are transmitted include identification information on portable terminal 100 (or the user). Further, the movement state information is transmitted at any time.

Further, for example, controller 130 causes, based on determination result information (details will be described later) received by communicator 110 from server 200, outputter 140 to execute an attention-attracting operation (details will be described later).

Outputter 140 is an output device that performs an attention-attracting operation.

The attention-attracting operation is an operation to attract the attention of a user of portable terminal 100 in a case where there is a possibility that the user of portable terminal 100 will collide with another user (hereinafter, this possibility will be referred to as a collision possibility or may also be referred to as a collision risk).

For example, in a case where outputter 140 is a display of portable terminal 100, an image indicating that there is a collision possibility is displayed as the attention-attracting operation.

Further, for example, in a case where outputter 140 is a speaker of portable terminal 100, a voice (which may also be a simple warning sound) indicating that there is a collision possibility is outputted as the attention-attracting operation.

Further, for example, in a case where outputter 140 is a vibrator of portable terminal 100, portable terminal 100 vibrates as the attention-attracting operation.

Note that, the various attention-attracting operations described above may also be performed in combination.

Further, in the present embodiment, a case where outputter 140 is provided in portable terminal 100 has been described as an example, but the present disclosure is not limited thereto. For example, outputter 140 may also be an output device that is provided outside of portable terminal 100 and is capable of communicating with portable terminal 100 wirelessly. Examples of such an outputting device include a speaker or a head-up display which is built in a helmet used by a cyclist and a rider; a display, a speaker, or a steering wheel which is mounted in the cabin of an automobile; and a vibrator which vibrates a seat. In this case, controller 130 instructs outputter 140 outside of portable terminal 100 to execute attention attraction through wireless communication via communicator 110.

Next, server 200 will be described.

Server 200 is an information processing apparatus that collects movement state information on each of a plurality of users (which may also be referred to as portable terminals 100) and determines, based on the movement state information, whether there is a collision possibility between the users. Although FIG. 1 illustrates server 200 as one apparatus, server 200 may be an aggregate of a plurality of servers at which each processor to be described below is dispersed.

As illustrated in FIG. 1, server 200 includes communicator 210, storer 220, determiner 230, and controller 240.

Communicator 210 is a communication device that performs network communication such as internet communication.

For example, communicator 210 receives the movement state information and the attribute information, which have been described above, from portable terminal 100 or transmits determination result information to be described later to portable terminal 100. Note that, communicator 210 corresponds to an example of the "acquirer that acquires attribute information".

Storer 220 is a storage device that stores various information.

For example, storer 220 stores movement state information and attribute information, which are collected from each of a plurality of portable terminals 100, for each user (identification information).

Further, for example, storer 220 stores map information indicating sidewalks, roadways, buildings, and the like.

Determiner 230 is a determination device that determines (predicts), based on movement state information on each user and map information, whether there is a possibility that users who are close to each other will collide with each other. In the present embodiment, a case where a possibility of a dangerous state determined by determiner 230 is a possibility that users will collide with each other will be described as an example. Note that, other examples of the possibility of the dangerous state will be described in variations to be described later.

Specifically, determiner 230 first sets dangerous objects and protection objects for each user based on attribute information.

A dangerous object is an attribute with a high probability of becoming a person responsible for a traffic accident. A protection object is an attribute with a high probability of becoming a victim of a traffic accident.

Figure 4:
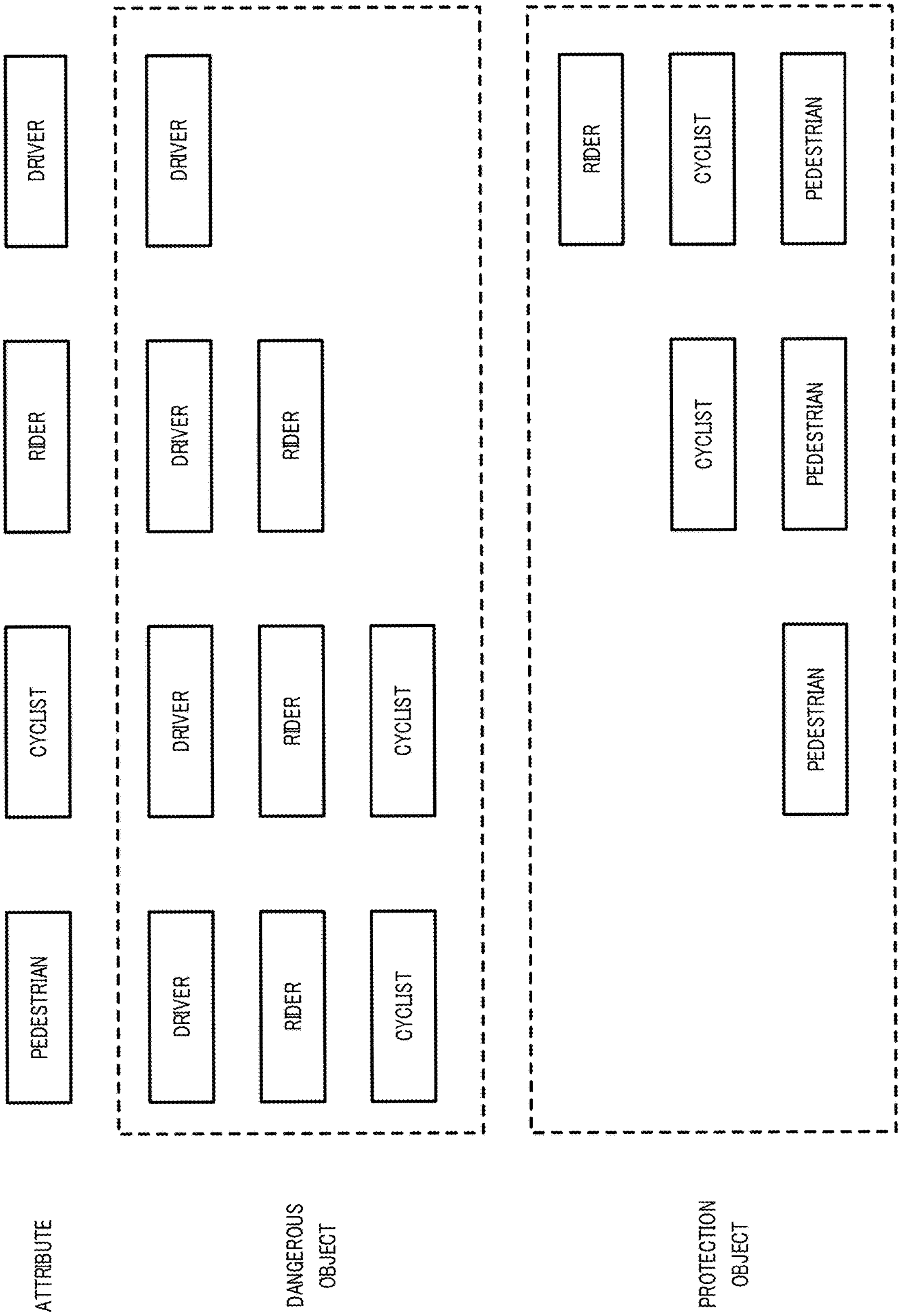
FIG. 4 illustrates a list of dangerous objects and protection objects for each attribute according to the embodiment of the present disclosure.

Here, exemplary dangerous objects and protection objects will be described using FIG. 4. FIG. 4 illustrates a list of dangerous objects and protection objects for each attribute.

For example, in a case where the attribute of the user is the pedestrian, the driver, the rider, and the cyclist are set as the dangerous objects, and no protection object is set.

For example, in a case where the attribute of the user is the cyclist, the driver, the rider, and the cyclist are set as the dangerous objects, and the pedestrian is set as the protection object.

For example, in a case where the attribute of the user is the rider, the driver and the rider are set as the dangerous objects, and the pedestrian and the cyclist are set as the protection objects.

For example, in a case where the attribute of the user is the driver, the driver is set as the dangerous object, and the pedestrian, the cyclist, and the rider are set as the protection objects.

As described above, for a given attribute, attributes whose users become relatively more powerful road users are set as dangerous objects, and attributes whose users become relatively vulnerable road users are set as protection objects.

The purpose of classification into dangerous objects and protection objects is, for example, to expand the flexibility of a safety assistance service, such as only the dangerous object side is prompted to avoid danger, whereas the protection object side is guided to safety without feeling troublesomeness due to indications as well as without the knowledge of the dangerous object side.

Exemplary dangerous objects and protection objects have been described above. Hereinafter, determiner 230 will be described again.

Next, determiner 230 sets a safe region and a dangerous region for each user based on the attribute information.

The safe region is a region in which the user is unlikely to get involved in a traffic accident. The dangerous region is a region in which the user is likely to get involved in a traffic accident.

For example, in a case where the attribute of the user is the pedestrian or the cyclist, the sidewalk is set as the safe region, and the roadway is set as the dangerous region.

For example, in a case where the attribute of the user is the rider or the driver, the roadway is set as the dangerous region, and no safe region is set.

Next, determiner 230 determines, based on each setting described above, the movement state information, and the map information, whether there is a collision possibility. This collision possibility determination processing may be performed for a user present in a dangerous region and may not be performed for a user present in a safe region.

Figure 5:
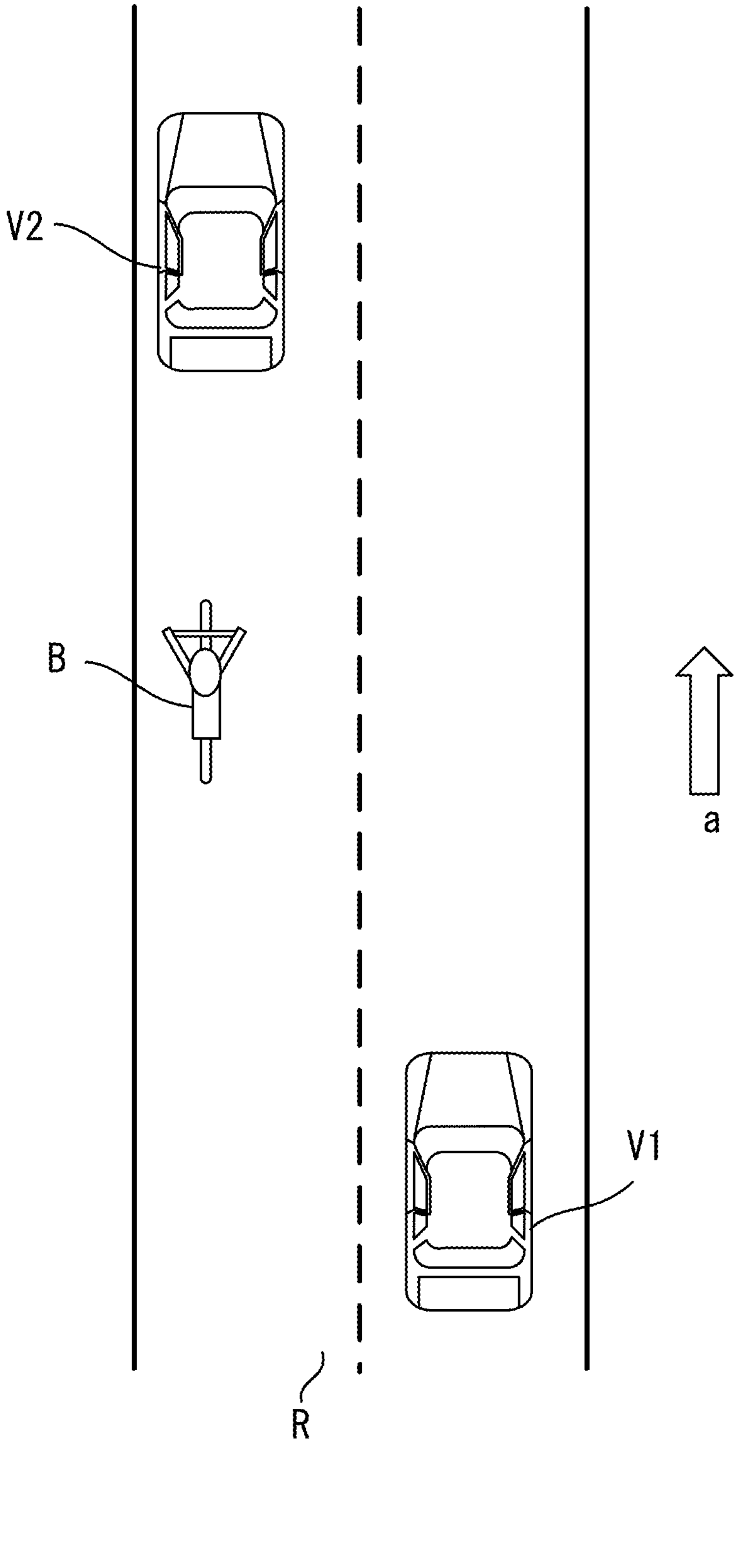
FIG. 5 is a schematic view of an exemplary movement situation of a plurality of users according to the embodiment of the present disclosure viewed from directly above.

Here, exemplary collision possibility determination processing will be described using FIG. 5. FIG. 5 is a schematic view of an exemplary movement situation of a plurality of users viewed from directly above.

As illustrated in FIG. 5, roadway R includes two vehicle traffic lanes (left-side traffic lane and right-side traffic lane) in the same direction. Arrow a in the drawing indicates the travel direction of bicycle B and automobiles V1 and V2. On the left-side traffic lane, automobile V2 is stopped in front of bicycle B that is traveling. Automobile V1 that is traveling on the right-side traffic lane is approaching behind bicycle B.

First, determiner 230 collates the current positions of the user (cyclist) who rides bicycle B, the user (driver) who rides automobile V1, and the user (driver) who rides automobile V2, which are indicated in movement state information on each user, with map information, whereby determiner 230 judges that each user is in a dangerous region, and determines that the respective users are objects of collision possibility determination processing. All the three users here are assumed to be users of portable terminal 100. Note that, in a case where the occupant of automobile V2 that is a parked vehicle is not a user of portable terminal 100, the movement state information may be acquired by a camera or the like installed at the road.

Next, determiner 230 recognizes, based on the movement state information and the map information, the respective positional relationships (for example, the positional relationships illustrated in FIG. 5), travel directions, and movement speeds of bicycle B and automobiles V1 and V2.

For example, in a case where determiner 230 recognizes that automobile V2 is stopped on the left-side traffic lane (the vehicle speed is zero); that bicycle B is traveling in the direction of arrow a on the left-side traffic lane behind automobile V2; and that automobile V1 is traveling at a speed faster than bicycle B in the direction of arrow a on the right-side traffic lane behind bicycle B, determiner 230 predicts that bicycle B will change its course from the left-side traffic lane into the right-side traffic lane, and determines that there is a collision possibility between bicycle B and automobile V1.

Note that, in a case where the movement state information includes, for example, information indicating a tilt of bicycle B in the right direction, determiner 230 may predict that bicycle B will change its course from the left-side traffic lane into the right-side traffic lane. The use of tilt information enables more accurate prediction.

On the other hand, for example, in a case where determiner 230 recognizes that automobile V2 is stopped on the left-side traffic lane (the vehicle speed is zero); that bicycle B is stopped on the left-side traffic lane behind automobile V2; and that automobile V1 is traveling in the direction of arrow a on the right-side traffic lane behind bicycle B, determiner 230 predicts that automobile V1 will overtake bicycle B which is being stopped, and determines that there is no collision possibility between bicycle B and automobile V1.

Note that, the above-described collision possibility determination processing is merely an example, and determiner 230 may use any other method known in the art to determine whether there is a collision possibility.

Exemplary collision possibility determination processing has been described above. Hereinafter, determiner 230 will be described again.

In a case where determiner 230 determines that there is no collision possibility, determiner 230 performs, based on movement state information and attribute information that are newly received from each portable terminal 100, the above-described setting processing of dangerous objects, protection objects, a safe region, and a dangerous region as well as collision possibility determination processing again.

In a case where determiner 230 determines that there is a collision possibility, on the other hand, processing by controller 240 (details will be described later) is performed.

Controller 240 is a control device that determines at which portable terminal 100 among respective portable terminals 100 of users between whom there is a collision possibility an attention-attracting operation is executed, and controls communicator 210 such that communicator 210 executes an indication to portable terminal 100 at which the attention-attracting operation is executed.

Specifically, controller 240 first compares attribute information on each user for whom there is a collision possibility, and determines that portable terminal 100 of a user who is a relatively more powerful road user is a terminal apparatus at which an attention-attracting operation is executed.

For example, in case where there is a collision possibility between bicycle B and automobile V1 as illustrated in FIG. 5, the driver is a dangerous object (more powerful road user) viewed from the cyclist as illustrated in FIG. 4, and thus, controller 240 determines that portable terminal 100 of the user of automobile V1 between portable terminal 100 of the user of bicycle B and portable terminal 100 of the user of automobile V1 is a terminal apparatus at which an attention-attracting operation is executed.

Next, controller 240 controls communicator 210 such that communicator 210 transmits determination result information, which indicates that there is the collision possibility, to portable terminal 100 determined as the terminal apparatus at which the attention-attracting operation is executed. Thus, the determination result information is transmitted from communicator 210 to portable terminal 100.

The determination result information may be simply information indicating that there is a collision possibility, or may include attribute information and current position information on users who may get involved in a collision. For example, determination result information that is transmitted to automobile V1 illustrated in FIG. 5 may include information to the effect that automobile V1 may collide with bicycle B that is traveling on the left side and ahead of automobile V1.

As described above, in a case where portable terminal 100 (specifically, communicator 110) receives determination result information, controller 130 causes outputter 140 to execute an attention-attracting operation based on the determination result information.

For example, in a case where determination result information simply indicates that there is a collision possibility, controller 130 causes outputter 140 to display an image, output a voice, and execute a vibration of portable terminal 100, where the image, the voice, and the vibration indicate that there is the collision possibility. Further, for example, in a case where determination result information includes attribute information and current position information on a user who may get involved in a collision, controller 130 causes outputter 140 to display an image and output a voice, where the image and the voice indicate that there is the collision possibility as well as indicate the attribute information and the current position information. Note that, the attention-attracting operation that is performed based on determination result information may be performed based on settings of portable terminal 100 regardless of the content of the determination result information.

Note that, controller 130 of portable terminal 100 may cause outputter 140 to execute an attention-attracting operation based on determination result information and information indicating a tilt of bicycle B in the right direction, which are received from server 200. For example, in a case where determiner 230 recognizes that automobile V2 is stopped on the left-side traffic lane; that bicycle B is traveling in the direction of arrow a on the left-side traffic lane behind automobile V2; and that automobile V1 is traveling at a speed faster than bicycle B in the direction of arrow a on the right-side traffic lane behind bicycle B, server 200 transmits determination result information to portable terminal 100 determined as a terminal apparatus at which an attention-attracting operation is executed. Portable terminal 100 receives the determination result information from server 200, but does not execute the attention-attracting operation at the time of receiving the determination result information, and waits the execution of the attention-attracting operation. Thereafter, in a case where a sensor provided in portable terminal 100 detects a tilt of portable terminal 100 (for example, in a case where the user tilts bicycle B in the right direction in order to avoid automobile V2) while portable terminal 100 is waiting the attention-attracting operation, portable terminal 100 executes the attention-attracting operation. In other words, it is possible to perform an indication to the user by using as a trigger the detection of a tilt of portable terminal 100 while portable terminal 100 is waiting the attention-attracting operation. For this reason, it is possible to reduce indications unnecessary and troublesome for the user since a behavior change in the user is recognized, an indication to the user is performed in a case where there is a possibility of a dangerous state, and no indication to the user is performed in a case where there is no possibility of a dangerous state.

An exemplary configuration of safety assistance system 1 (portable terminal 100 and server 200) in the present embodiment has been described above.

Figure 6:
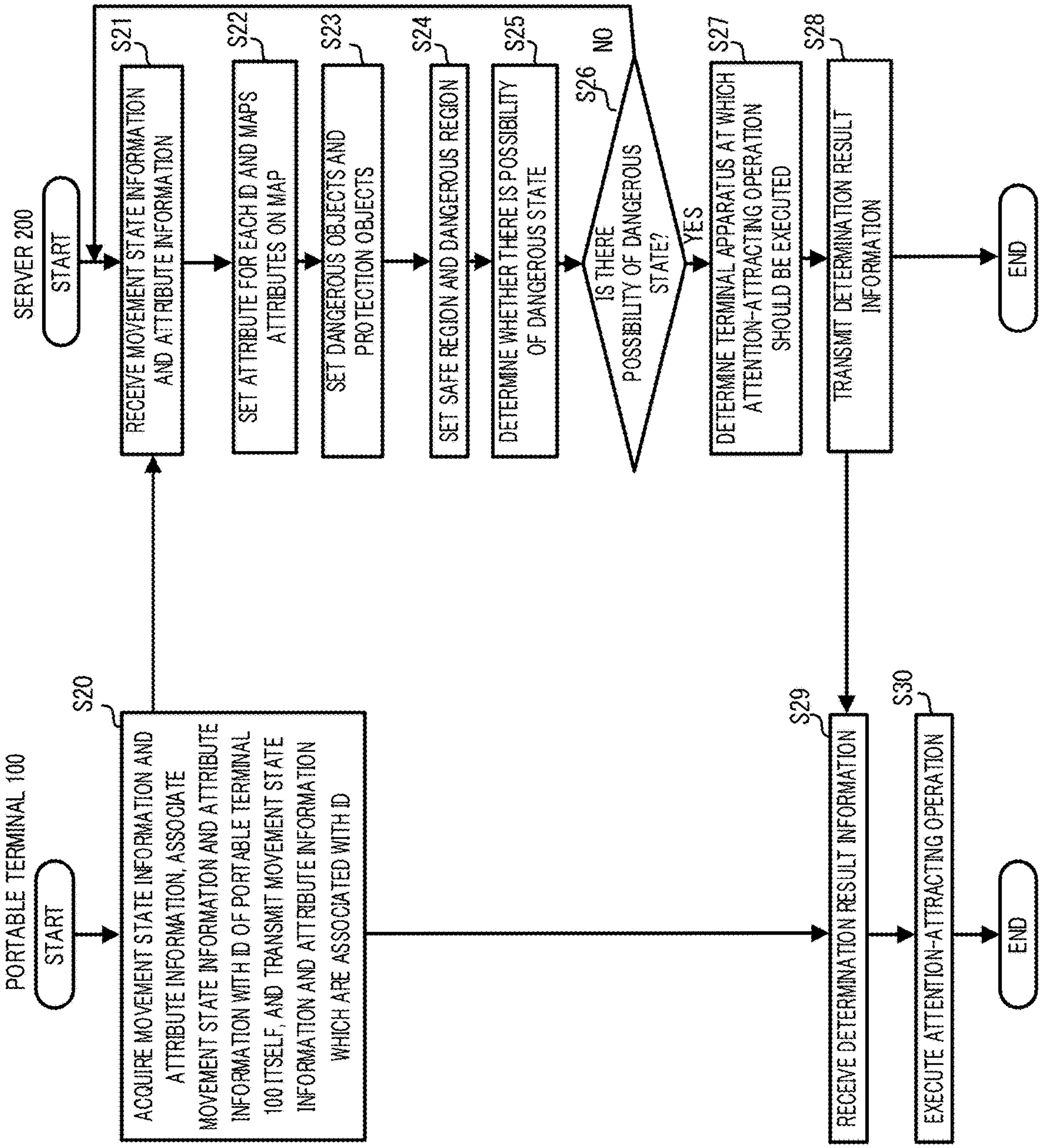
FIG. 6 is a sequence chart illustrating exemplary operations of the portable terminal and the server according to the embodiment of the present disclosure.

Next, exemplary operations of portable terminal 100 and server 200 in the present embodiment will be described using FIG. 6. FIG. 6 is a sequence chart illustrating exemplary operations of portable terminal 100 and server 200. Note that, although FIG. 6 illustrates processing between one portable terminal 100 and server 200, the flow illustrated in FIG. 6 is executed between each of a plurality of portable terminals 100 and server 200. Accordingly, server 200 manages each portable terminal 100 by identification information (ID), and information transmitted from each portable terminal 100 to server 200 includes the identification information. Thus, server 200 can recognize from which portable terminal 100 server 200 receives information.

First, each portable terminal 100 acquires movement state information and attribute information, associates the movement state information and the attribute information with the ID of portable terminal 100 itself, and transmits the movement state information and the attribute information, which are associated with the ID, to server 200 (step S20).

Next, server 200 receives the movement state information and attribute information, which are associated with the ID, from each portable terminal 100 (step S21).

Next, server 200 sets an attribute for each ID and maps the attributes on a map (step S22).

Next, server 200 sets dangerous objects and protection objects based on the attribute information (step S23).

Next, server 200 sets a safe region and a dangerous region based on the attribute information (step S24).

Next, server 200 determines, based on the movement state information and map information, whether there is a possibility of a dangerous state (step S25). Note that, in the present embodiment, the possibility of the dangerous state is, for example, a collision possibility between users.

In a case where there is no possibility of a dangerous state (step S26/NO), the flow returns to step S21. In this case, server 200 executes steps S22 to S25 again based on movement state information and attribute information that are newly received from portable terminal 100 in step S21.

In a case where there is a possibility of a dangerous state (step S26/YES), on the other hand, server 200 determines, among portable terminals 100 of users between whom there is the possibility, a terminal apparatus at which an attention-attracting operation should be executed (step S27).

Server 200 transmits determination result information to portable terminal 100 determined as the terminal apparatus at which the attention-attracting operation should be executed (step S28).

Portable terminal 100 receives the determination result information from server 200 (step S29).

Portable terminal 100 causes a predetermined outputter to execute the attention-attracting operation (step S30).

Exemplary operations of portable terminal 100 and server 200 according to the embodiment have been described above.

Server 200 in the present embodiment described above is an information processing apparatus that collects movement state information on each of a plurality of users and determines, based on the movement state information, whether there is a possibility of a dangerous state, and is characterized by including:

- an acquirer (for example, communicator 210) that acquires attribute information on each of the plurality of users; and
- controller 240 that determines, based on the attribute information on each of some users of the plurality of users where the some users are users between whom there is the possibility of the dangerous state, at which terminal apparatus among respective terminal apparatuses (for example, portable terminals 100) of the some users an attention-attracting operation is executed.

With this feature, attention attraction is performed only for one of users between whom there is a collision possibility, and thus, attention attraction is not frequently performed, and it is possible to decrease troublesomeness that users feel. That is, server 200 in the present embodiment can further improve the convenience in safety assistance system 1. As a result, the number of participants in safety assistance system 1 can be increased, which can contribute to a reduction in transportation accidents.

In particular, server 200 in the present embodiment is characterized by comparing attribute information on each of users between whom there is a collision possibility and determining that the terminal apparatus of, among the users, a user who is a relatively more powerful road user is a terminal apparatus at which an attention-attracting operation is executed.

With this feature, it is possible to prevent attention attraction from being frequently performed for a vulnerable road user (for example, a pedestrian or a cyclist). That is, it is possible to reduce troublesomeness for a vulnerable road user for whom the frequency of attention attraction tends to increase.

Any of the embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

Hereinafter, variations applicable to the embodiment will be described.

[Variation 1]

In the embodiment, a case where server 200 collects movement state information and attribute information from a plurality of portable terminals 100, and thus, each of a plurality of users becomes a determination object for a collision possibility has been described as an example, but the present disclosure is not limited thereto.

For example, portable terminal 100 (hereinafter referred to as the own terminal) may receive movement state information and attribute information on the user of another terminal (portable terminal 100 other than the own terminal) and determine a collision possibility between the user of the own terminal and another user based on the movement state information and the attribute information.

In that case, the own terminal may include, in addition to each processor illustrated in FIG. 1, storer 220 and determiner 230 of server 200. Hereinafter, the flow of operations in this case will be briefly described.

First, acquirer 120 acquires attribute information and movement state information on the user of the own terminal in the same manner as in the embodiment.

Further, communicator 110 receives attribute information and movement state information on the user of another terminal. At this time, communicator 110 may receive the attribute information and the movement state information on the user of the other terminal directly from the other terminal or from a distribution server (not illustrated).

Next, determiner 230 performs, based on the attribute information and the movement state information, which are acquired by acquirer 120 and communicator 110, and map information stored in storer 220, the same processing as in the embodiment (for example, settings of dangerous objects and protection objects, settings of a safe region and a dangerous region, and collision possibility determination processing). The object of the collision possibility determination processing is, however, the user of the own terminal (conversely, collision possibility determination processing between the users of other terminals is not executed).

In a case where determiner 230 determines that there is a collision possibility, controller 130 determines the terminal apparatus at which an attention-attracting operation is executed, in the same manner as controller 240 described in the embodiment.

In a case where controller 130 determines that the terminal apparatus at which the attention-attracting operation is executed is the own terminal, controller 130 causes outputter 140 to execute a predetermined attention-attracting operation.

In a case where controller 130 determines that the terminal apparatus at which the attention-attracting operation is executed is the other terminal, on the other hand, controller 130 controls communicator 110 such that communicator 110 transmits the same determination result information as in the embodiment to the other terminal. Thus, the determination result information is transmitted to the other terminal directly or via a distribution server (not illustrated). Then, when the determination result information is received, controller 130 of the other terminal controls outputter 140 such that outputter 140 executes a predetermined attention-attracting operation.

As described above, portable terminal 100 in the present variation is an information processing apparatus that collects movement state information on each of a plurality of users and determines, based on the movement state information, whether there is a collision possibility between the plurality of users, and is characterized by including: an acquirer (for example, communicator 110 and acquirer 120) that acquires attribute information on each of the plurality of users; and controller 130 that determines, based on the attribute information on each of some users of the plurality of users where the some users are users between whom there is the collision possibility, at which terminal apparatus among respective terminal apparatuses (for example, portable terminals 100) of the some users an attention-attracting operation is executed.

With this feature, portable terminal 100 in the present variation can achieve the same effect as in the embodiment described above.

[Variation 2]

In the embodiment, a pedestrian on the sidewalk is not an object of the collision possibility determination processing since the sidewalk is set as the safe region for the pedestrian. However, there is a case where a bicycle travels on the sidewalk, in which case a collision possibility between a pedestrian and the cyclist may occur.

Accordingly, determiner 230 may determine whether a cyclist is present on the sidewalk on which a pedestrian is present. Then, in a case where a pedestrian and a cyclist are present on the same sidewalk, controller 240 transmits indication information, which indicates the presence of the cyclist, to portable terminal 100 of the pedestrian, and transmits prompting information, which prompts a change of the travel path, to portable terminal 100 of the cyclist.

Controller 130 of portable terminal 100 of the pedestrian causes, based on the received indication information, outputter 140 to display an image, output a voice, and/or the like, where the image and the voice inform the presence of the cyclist.

Controller 130 of portable terminal 100 of the cyclist causes, based on the received prompting information, outputter 140 to display an image, output a voice, and/or the like, where the image and the voice prompt a change of the travel path.

Such operations make it possible to decrease a collision possibility between a pedestrian and a cyclist who are present on the sidewalk.

[Variation 3]

In a case where the attribute of the user is the driver, built-in in-vehicle equipment (illustration is omitted; for example, a car navigation system, a V2X communication unit, or the like) may be used instead of portable terminal 100. That is, communicator 110, acquirer 120, controller 130, and outputter 140 which are illustrated in FIG. 1 may also be provided in the in-vehicle equipment.

In that case, the movement state information that is transmitted to server 200 may include, for example, information indicating a steering operation and/or a direction-indicating operation that are detected by an in-vehicle sensor or the like. Thus, it is possible to improve the accuracy of predicting the course of the driver (automobile) for server 200 (specifically, determiner 230).

As described in the embodiment, the attribute of the user may be changed from the pedestrian to the driver, for example. In this case, it may be configured such that when a user who holds portable terminal 100 rides an automobile, the in-vehicle equipment may take over the functions of each processor of portable terminal 100 by performing authentication processing between portable terminal 100 and the in-vehicle equipment through wireless communication. Thus, it is possible to prevent an operation of portable terminal 100 from competing with an operation of the in-vehicle equipment. Note that, in a case where the user gets out of the automobile and the attribute of the user is changed from the driver to the pedestrian, the in-vehicle equipment finishes taking over the operations, and the operations of each processor are executed again at portable terminal 100.

For example, in a case where the attribute of the user is updated from the pedestrian to the driver in attribute determination processing, portable terminal 100 judges whether there is in-vehicle equipment capable of taking over the functions of each processor of portable terminal 100. Here, the in-vehicle equipment capable of taking over the functions may be an operating system for dashboard and car navigation, or a V2X communication unit. Further, in the judgement on whether there is in-vehicle equipment capable of taking over the functions, it may be judged that there is in-vehicle equipment capable of taking over the functions by establishment of a connection (cable connection) with portable terminal 100, in a case where the in-vehicle equipment is an operating system for dashboard and car navigation. In addition, it may be judged that there is in-vehicle equipment capable of taking over the functions by authentication between portable terminal 100 and the in-vehicle equipment via a server, in a case where the in-vehicle equipment is a V2X communication unit. Then, in a case where there is in-vehicle equipment capable of taking over the functions, the in-vehicle equipment takes over and executes the functions of each processor of portable terminal 100, and portable terminal 100 executes only attribute determination. In a case where there is no in-vehicle equipment capable of taking over the functions, on the other hand, portable terminal 100 continues to execute the functions of each processor. As an example, in a case where the in-vehicle equipment is an operating system for dashboard and car navigation, an attention-attracting operation is executed via a display panel of the car navigation and/or a voice output. In a case where the in-vehicle equipment is a V2X communication unit, an attention-attracting operation is executed via a head-up display (HUD), a display panel of a liquid crystal meter, and/or a voice output. Thus, it is possible to prevent attention attraction from occurring at both portable terminal 100 and the in-vehicle equipment due to an operation of portable terminal 100 competing with an operation of the in-vehicle equipment, and to prevent the user from feeling troublesomeness. Note that, in a case where both an operating system for dashboard and car navigation and a V2X communication unit are present, the in-vehicle equipment that takes over the functions may be determined according to the number of users per unit area based on map information. Specifically, portable terminal 100 receives the number of users (Nvx) around the V2X communication unit per unit area confirmed by the V2X communication unit. Further, portable terminal 100 inquires the number of users (Nc) around server 200 per unit area confirmed by server 200, and receives the number of users (Nc). Then, portable terminal 100 compares the number of users (Nvx) with the number of users (Nc), and in a case where the number of users (Nvx) is larger, portable terminal 100 determines that the V2X communication unit is the in-vehicle equipment that takes over the functions, whereas in a case where the number of users (Nc) is larger, portable terminal 100 determines that the operating system for dashboard and car navigation is the in-vehicle equipment that takes over the functions. Note that, a number obtained by adding or subtracting correction factor $\alpha$ to or from the number of users (Nc) may be compared with the number of users (Nvx). Thus, it is possible to prioritize in-vehicle equipment around which a larger number of users can be confirmed, and it is possible to execute a more accurate attention-attracting operation.

[Variation 4]

In the embodiment, a case where, when the attribute of the user is the pedestrian, the attention-attracting operation is not executed at portable terminal 100 of the user as long as the user is on the sidewalk (in other words, unless the user enters the roadway) has been described as an example, but it may be configured such that the user himself/herself can set that the attention-attracting operation is not executed at portable terminal 100 that the user holds. Accordingly, no attention attraction is performed for a pedestrian, and thus, the user does not feel troublesomeness, and the expansion of the utilization of the safety assistance service is promoted. As a result, it is easier for many users to participate, and a safety assistance service with high certainty is realized as a whole.

[Variation 5]

In the embodiment, a case where the possibility of the dangerous state is a collision possibility between users has been described as an example, but the present disclosure is not limited thereto. Hereinafter, other examples will be described. Note that, steps S20 to S23 and S27 to S29 in FIG. 6 in each example to be described below are the same as those in the embodiment, and thus, descriptions thereof will be omitted here.

Example 1

For example, the possibility of the dangerous state may be determined based on speeding of a vehicle.

In this case, the movement state information includes information on the movement speed of a user whose attribute is the cyclist (the driver of a bicycle), the rider (the driver of a motorcycle), or the driver (the driver of an automobile) (that is, the vehicle speed of one of a bicycle, a motorcycle, or an automobile on which the user rides). The movement speed may be, for example, a value calculated based on the Doppler effect of a GPS signal or the like.

Determiner 230 determines whether the user (bicycle, motorcycle, or automobile) is speeding, based on the current position and the movement speed, which are indicated in the movement state information, and the speed limit for the road, which is indicated in the map information. In a case where determiner 230 determines that the user is speeding, controller 240 determines that portable terminal 100 of the user is a terminal apparatus at which an attention-attracting operation should be executed. Note that, the determination of speeding may be performed by portable terminal 100, in which case portable terminal 100 may perform the determination by receiving the speed limit for the road, which is indicated in the map information, from server 200, and by comparing the speed limit with the movement speed at controller 130.

Example 2

For example, the possibility of the dangerous state may be determined based on whether a bicycle is traveling on the sidewalk.

Determiner 230 determines, based on the current position, which is indicated in movement state information on a user whose attribute is the cyclist, and map information, whether the user (bicycle) is present on the sidewalk and is traveling thereon. In a case where determiner 230 determines that the user is traveling on a bicycle on the sidewalk, controller 240 determines that portable terminal 100 of the user is a terminal apparatus at which an attention-attracting operation (for example, an indication based on the prompting information described in Variation 2) should be executed.

Example 3

For example, the possibility of the dangerous state may be determined based on a rear-end collision possibility with a parked vehicle.

Determiner 230 determines, based on the current position, which is indicated in movement state information on a user whose attribute is the cyclist, the rider, or the driver, and detection information (for example, a detection information result by a camera installed at a non-line-of-sight intersection, or the like) acquired from an external apparatus, whether there is a possibility that the user (bicycle or automobile) will get involved in a rear-end collision with a parked vehicle. In a case where determiner 230 determines that there is a possibility that the user will get involved in a rear-end collision with a parked vehicle, controller 240 determines that portable terminal 100 of the user is a terminal apparatus at which an attention-attracting operation should be executed. Note that, in a case where the coordinates of the position of the user when the attribute of the user is switched from the driver to the pedestrian are on the roadway in the attribute determination for portable terminal 100, server 200 may judge in a method of detecting a parked vehicle that the vehicle that the user of portable terminal 100 described above has driven (the vehicle associated with portable terminal 100 through position information and/or communication authentication) is a parked vehicle.

Example 4

For example, the possibility of the dangerous state may be determined based on whether a predetermined number or more of users whose attribute is the pedestrian are present within a predetermined range.

Determiner 230 determines, based on the current position, which is indicated in movement state information on a user whose attribute is the pedestrian (hereinafter referred to as the first user), and the current position, which is indicated in movement state information on a user whose attribute is one of the cyclist, the rider, and the driver (hereinafter referred to as the second user) (in a case where the second user is a driver, the latter current position may include a travel route registered in a car navigation), whether a predetermined number or more of pedestrians are present within a predetermined range in the travel direction of the second user. For example, determiner 230 may determine whether 20 or more pedestrians are present within 10 $m^2$, where 20 is the predetermined number and 10 $m^2$ is the predetermined range. In a case where determiner 230 determines that the predetermined number or more of pedestrians are present within the predetermined range, controller 240 determines that portable terminal 100 of the second user is a terminal apparatus at which an attention-attracting operation should be executed. Further, controller 240 may search, based on map information or the like, for a travel route that allows a location, at which a large number of pedestrians are present, to be avoided, and may transmit guidance information, which indicates the travel route, to portable terminal 100 of the second user. Thus, an indication of the travel route described above (an exemplary attention-attracting operation) is performed at portable terminal 100 of the second user. Thus, the second user can easily travel on a safe route. Further, the second user can prevent a delay in arriving at his/her destination.

Variations have been described above. The variations described above may be combined as appropriate.

The disclosure of Japanese Patent Application No. 2022-169166, filed on Oct. 21, 2022, including the specification, drawings and abstract, is incorporated herein by reference in its entirety.

INDUSTRIAL APPLICABILITY

The information processing apparatus and the information processing method in the present disclosure are useful for technologies that assist the safety of users in motion.

REFERENCE SIGNS LIST

- 1 Safety assistance system
- 100 Portable terminal
- 110 Communicator
- 120 Acquirer
- 130 Controller
- 140 Outputter
- 200 Server
- 210 Communicator
- 220 Storer
- 230 Determiner
- 240 Controller

The invention claimed is:

1. An information processing apparatus which, in operation, collects movement state information on each of a plurality of users and determines, based on the movement state information, whether there is a possibility of a dangerous state, the information processing apparatus comprising:
- a processor; and
- a memory having instructions that, when executed by the processor, cause the processor to perform operations comprising:
- acquiring attribute information on each of the plurality of users, wherein the attribute information indicates each of the plurality of users as a danger object or a protection object;
- determining, based on the attribute information, a first user as the danger object for executing an attention-attracting operation among the plurality of users and a second user as the protection object for omitting the attention-attracting operation among the plurality of users, the first user and the second user being users between whom there is the possibility of the dangerous state;
- transmitting information about the attention-attracting operation to a first terminal apparatus of the first user through a communication circuitry; and
- omitting transmission of the information about the attention-attracting operation to a second terminal apparatus of the second user through the communication circuitry.

2. The information processing apparatus according to claim 1, wherein:
- the possibility of the dangerous state is determined based on a collision possibility between the plurality of users, and
- in a case where there is the collision possibility between the plurality of users, the information about the attention-attracting operation is transmitted to the first terminal apparatus of the first user through the communication circuitry.

3. The information processing apparatus according to claim 1, wherein:
- the possibility of the dangerous state is determined based on speeding of the first user and the second user, and
- in a case where the speeding of the first user is detected, the information about the attention-attracting operation is transmitted to the first terminal apparatus of the first user through the communication circuitry.

4. The information processing apparatus according to claim 1, wherein:
- the possibility of the dangerous state is determined based on whether the first user travels on a bicycle on a sidewalk and the second user is a pedestrian on the sidewalk, and
- in a case where the first user travels on the bicycle on the sidewalk and the second user is the pedestrian on the sidewalk, the information about the attention-attracting operation is transmitted to the first terminal apparatus of the first user.

5. The information processing apparatus according to claim 4, wherein the attention-attracting operation is an indication that prompts a change of a travel pathway.

6. The information processing apparatus according to claim 1, wherein:
- the possibility of the dangerous state is determined based on a rear-end collision possibility between the first user on a parked vehicle and the second user, and
- in a case where there is the rear-end collision possibility between the first user on the parked vehicle and the second user, the information about the attention-attracting operation is transmitted to the first terminal apparatus of the first user.

7. The information processing apparatus according to claim 1, wherein:
- the second user is one or more pedestrians,
- the possibility of the dangerous state is determined based on whether a predetermined number or more of pedestrians are present within a predetermined range in a travel direction of the first, and
- in a case where the predetermined number or more of pedestrians are present within the predetermined range in the travel direction of the first user, the information about the attention-attracting operation is transmitted to the first terminal apparatus of the first user through the communication circuitry.

8. The information processing apparatus according to claim 7, wherein the information about the attention-attracting operation is an indication of a travel route that allows a location to be avoided, the location being a location at which the predetermined number or more of pedestrians are present.

9. The information processing apparatus according to claim 1, wherein:
- the attribute information indicates at least one of a pedestrian, a cyclist, a rider, and a driver of an automobile, and
- wherein the processor performs operations further comprising:

comparing the attribute information on the first user and the second user, and determining the first terminal apparatus of the first user for executing the attention-attracting operation, and the second terminal apparatus of the second user for omitting the attention-attracting operation, the first user and the second user being users between whom there is a collision possibility.

10. The information processing apparatus according to claim 1, wherein:

the information processing apparatus is a server, the server which, in operation, transmits the information about the attention-attracting operation to the first terminal apparatus, the information about the attention-attracting operation indicating that there is a collision possibility, and the first terminal apparatus which, in operation, causes a predetermined outputter to execute the attention-attracting operation based on the information about the attention-attracting operation.

11. The information processing apparatus according to claim 1, wherein:

the information processing apparatus is the first terminal apparatus or the second terminal apparatus, the plurality of users includes a user of the information processing apparatus, and in a case where the information processing apparatus is determined as the first terminal apparatus at which the attention-attracting operation is executed, an outputter of the information processing apparatus is caused to execute the attention-attracting operation.

12. An information processing method to be executed by an information processing apparatus which, in operation, collects movement state information on each of a plurality of users and determines, based on the movement state information, whether there is a possibility of a dangerous state, the information processing method comprising:

acquiring attribute information on each of the plurality of users, wherein the attribute information indicates each of the plurality of users as a danger object or a protection object;

determining, based on the attribute information, a first user as the danger object for executing an attention-attracting operation among the plurality of users and a second user as the protection object for omitting the attention-attracting operation among the plurality of users, the first user and the second user being users between whom there is the possibility of the dangerous state;

transmitting information about the attention-attracting operation to a first terminal apparatus of the first user through a communication circuitry; and omitting transmission of the information about the attention-attracting operation to a second terminal apparatus of the second user through the communication circuitry.

13. The information processing method according to claim 12, wherein:

the possibility of the dangerous state is determined based on a collision possibility between the plurality of users, and in a case where there is the collision possibility between the plurality of users, the information about the attention-attracting operation is transmitted to the first terminal apparatus of the first user through the communication circuitry.

14. The information processing method according to claim 12, wherein:

the possibility of the dangerous state is determined based on speeding of the first user and the second user, and in a case where the speeding of the first user is detected, the information about the attention-attracting operation is transmitted to the first terminal apparatus of the first user through the communication circuitry.

15. The information processing method according to claim 12, wherein:

the possibility of the dangerous state is determined based on whether the first user travels on a bicycle on a sidewalk and the second user is a pedestrian on the sidewalk, and in a case where the first user travels on the bicycle on the sidewalk and the second user is the pedestrian on the sidewalk, the information about the attention-attracting operation is transmitted to the first terminal apparatus of the first user.

16. The information processing method according to claim 12, wherein:

the possibility of the dangerous state is determined based on a rear-end collision possibility between the first user on a parked vehicle and the second user, and in a case where there is the rear-end collision possibility between the first user on the parked vehicle and the second user, the information about the attention-attracting operation is transmitted to the first terminal apparatus of the first user.

17. The information processing method according to claim 12, wherein:

the second user is one or more pedestrians, the possibility of the dangerous state is determined based on whether a predetermined number or more of pedestrians are present within a predetermined range in a travel direction of the first user, and in a case where the predetermined number or more of pedestrians are present within the predetermined range in the travel direction of the first user, the information about the attention-attracting operation is transmitted to the first terminal apparatus of the first user through the communication circuitry.

18. The information processing method according to claim 12, wherein:

the attribute information indicates at least one of a pedestrian, a cyclist, a rider, and a driver of an automobile, and wherein the information processing method further comprises:

comparing the attribute information on the first user and the second user, and determining the first terminal apparatus of the first user for executing the attention-attracting operation and the second user for omitting the attention-attracting operation, the first user and the second user being users between whom there is a collision possibility.

19. The information processing method according to claim 12, wherein:

the information processing apparatus is a server, the information about the attention-attracting operation is transmitted by the server to the first terminal apparatus, the information about the attention-attracting operation indicating that there is a collision possibility, and the attention-attracting operation is executed by an outputter of the first terminal apparatus based on the information about the attention-attracting operation.

20. The information processing method according to claim 12, wherein:

the information processing apparatus is the first terminal apparatus or the second terminal apparatus, the plurality of users includes a user of the information processing apparatus, and in a case where the information processing apparatus is determined as the first terminal apparatus at which the attention-attracting operation is executed, an outputter of the information processing apparatus is caused to execute the attention-attracting operation.

* * * * *